United States Patent
Russell

[15] 3,703,240
[45] Nov. 21, 1972

[54] TOWING DOLLY

[72] Inventor: Arvin E. Russell, 430 Sandra Lane, Indianapolis, Ind. 46227

[22] Filed: Nov. 18, 1970

[21] Appl. No.: 90,516

[52] U.S. Cl. ............................. 214/86 A, 280/402
[51] Int. Cl. .......................................... B60p 3/12
[58] Field of Search.............. 214/86 A, 77 R, 130 R; 280/402; 254/127, 128, 4 R, 4 B, 139.1

[56] References Cited

UNITED STATES PATENTS

| | | | |
|---|---|---|---|
| 3,522,892 | 8/1970 | Vegors | 214/86 A |
| 2,777,667 | 1/1957 | Stafford et al. | 254/127 X |
| 2,436,000 | 2/1948 | Fleming | 214/86 A |
| 2,183,478 | 12/1939 | Holmes et al. | 214/86 A |
| 2,807,381 | 9/1957 | Tegeler | 214/506 |

*Primary Examiner*—Albert J. Makay
*Attorney*—Hood, Gust, Irish, Lundy & Coffey

[57] ABSTRACT

A vehicle towing dolly comprising a wheeled chassis carrying a subframe mounted on the chassis to swing between a rearwardly extending position and a generally upright position, the subframe being provided with a pair of transversely-adjustable brackets adapted to engage, and be secured to, a part of a vehicle to be towed, a winch on the chassis, and a cable arrangement wound on the winch and operatively connected to the distal region of the subframe to swing the subframe to upright position after engagement with the vehicle part, the cable arrangement being directly connectable to a part of the vehicle to be towed.

9 Claims, 5 Drawing Figures

INVENTOR.
ARVIN E. RUSSELL
BY
*Hood, Gust, Irish, Lundy & Coffey*
ATTORNEYS

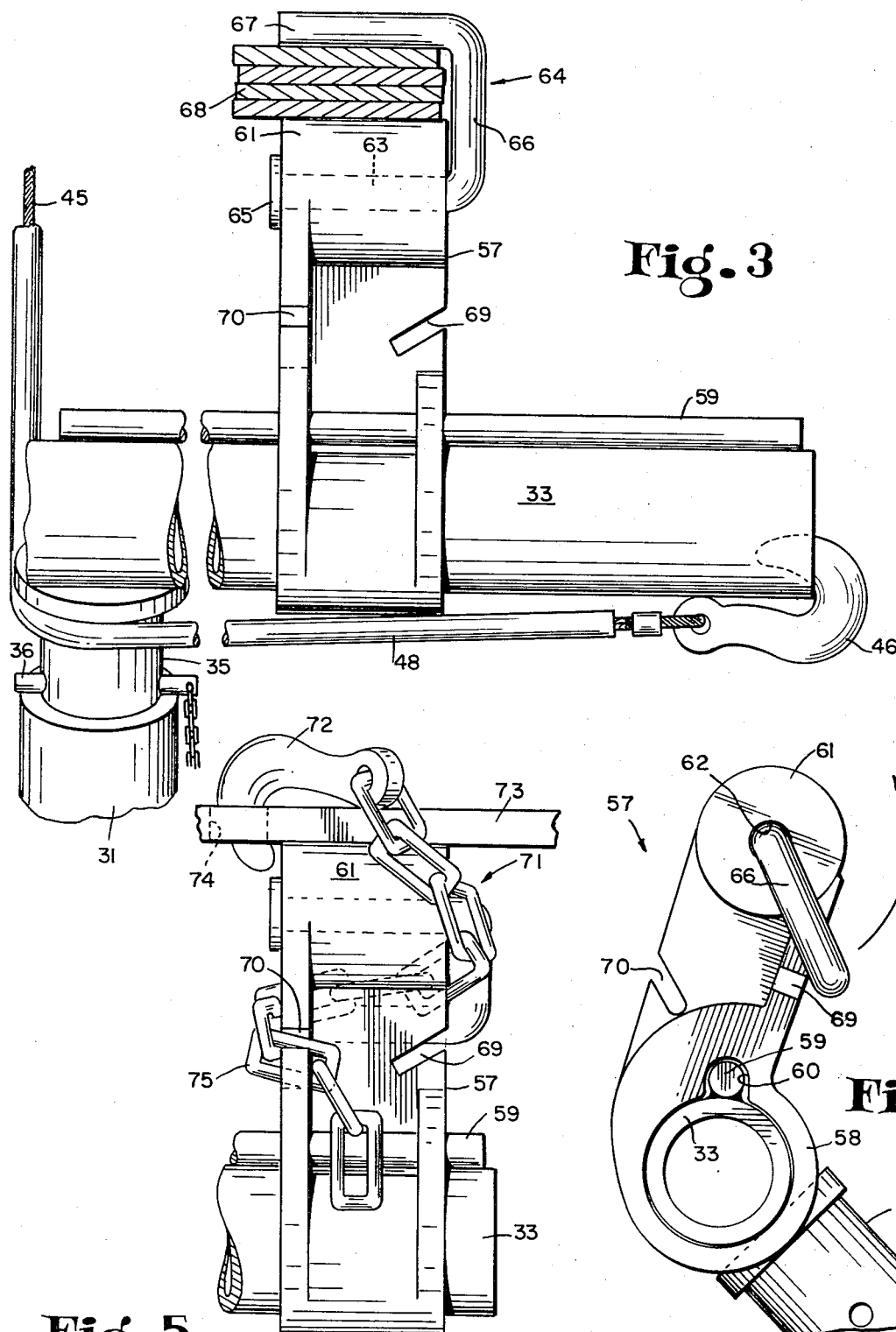

TOWING DOLLY

The present invention relates to a dolly for lifting and supporting one end of a vehicle to be towed. The primary object of the invention is to provide a simple, relatively light, readily manipulatable, inexpensive device of the character described, so constructed and arranged that its extended, low-lying rear end can be easily inserted beneath an end of a vehicle to be towed, whereby a secure connection between the dolly and the vehicle to be towed may be readily made, whereafter, the rearmost parts of the dolly may be swung, through the manipulation of force-applying means on the dolly, to a substantially upright position, thus lifting one end of the vehicle to be towed.

A further object of the invention is to provide, in such a dolly, an improved subframe which is movable between a substantially horizontal, rearwardly extending, low-lying position to a substantially upright position to accomplish the above described lifting. Another object of the invention is to provide improved means for establishing a towing coupling between the dolly and the vehicle to be towed. Still another object of the invention is to provide, in such a dolly, a cable arrangement which may itself establish a towing connection between the dolly and the vehicle to be towed, while additionally exerting force upon the subframe to swing the same to its upright position.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 3 is an enlarged, fragmentary view illustrating details of one lateral region of the subframe, the cable arrangement and one of the brackets for engagement with a part of the vehicle to be towed;

FIG. 4 is a fragmentary view taken from the right-hand end of FIG. 3; and

FIG. 5 is a fragmentary view taken in the plane of FIG. 3 and illustrating a further form of means for establishing a firm connection between a subframe bracket and an element of the vehicle to be towed.

Figure 1:
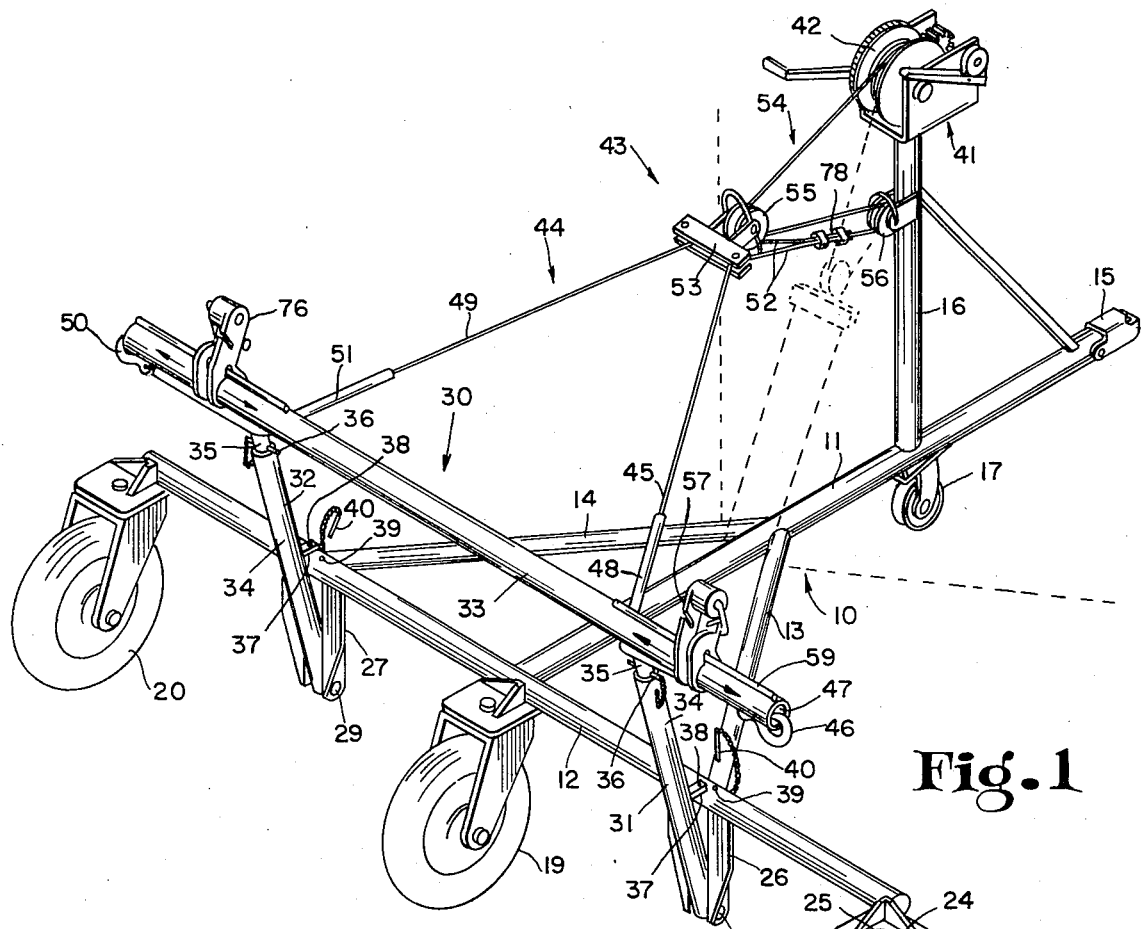
FIG. 1 is a perspective view of a towing dolly constructed in accordance with the present invention.

Referring more particularly to the drawings, the reference numeral 10 indicates generally a wheeled chassis comprising a spine 11 carrying, at its rear end, a transversely extending base 12 rigidly braced with respect to the spine by a pair of struts 13, 14. A suitable coupler element 15, whereby the chassis may be operatively connected to a towing vehicle, is carried at the forward end of the spine 11 and an upstanding mast 16 is positioned near the forward end of said spine.

A small caster wheel 17 is located preferably at the position of the mast; and three caster wheel assemblies 18, 19 and 20 are substantially equally laterally spaced across the length of the base 12. These assemblies may be identical and therefore only one will be described in detail. Each such assembly comprises a wheel 21 journalled on an axle 22 spanning the arms of a U-shaped frame 23, the base of which supports a pad 24 welded to the chassis base 12, the frame 23 being oscillable about a swivel pin 25.

Hangers 26 and 27 are rigidly dependent from the base 12 at points substantially equally oppositely spaced from the center of the chassis base 12 and carry pivots 28 and 29, respectively, from which is swingably supported a subframe indicated generally by the reference numeral 30.

The subframe comprises a pair of booms 31 and 32 whose proximal ends are respectively pivotally supported upon the pivots 28 and 29, and a cross bar 33 spanning and rigidly secured to the distal ends of the booms 31 and 32. In the preferred form of the invention, each boom is telescopically adjustable, comprising an outer member 34 and an inner member 35 axially slidably received therein. Each such inner member is provided with an axially-spaced series of perforations adapted, selectively, to receive a pin 36 for limiting inward movement of the member 35, as will be clear from inspection of FIG. 1.

Figure 2:
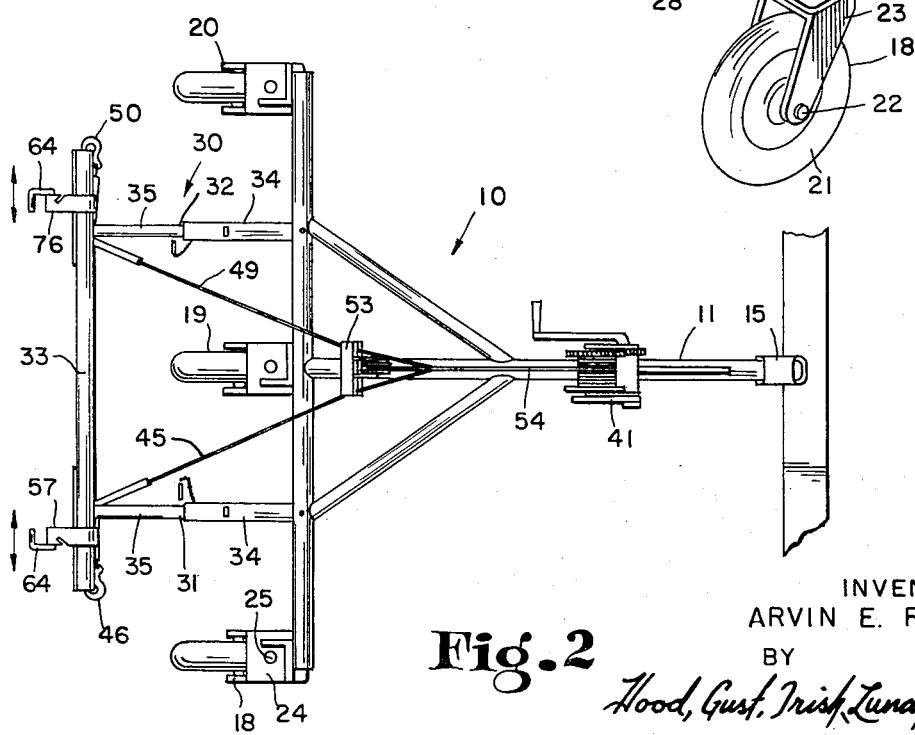
FIG. 2 is a plan view thereof, drawn to a reduced scale.

It will be apparent that the subframe 30 is movable between a substantially horizontal position as illustrated in FIG. 2 and a substantially upright position as illustrated in FIG. 1. Each boom is provided with a finger 37 formed with a perforation 38 registrable, in the extreme upright position of the subframe 30, with a perforation 39 in the cross bar 12. When the subframe is in this position, pins 40 may be entered through the registering perforations 38 and 39 rigidly to hold the subframe 30 in its extreme upright position.

Suitable means is provided for moving the subframe 30. As shown, a winch 41 is carried at the upper end of the mast 16, said winch comprising a drum 42, and flexible strand means, indicated generally by the reference numeral 43, provides an operative connection between the drum 42 and the distal region of the subframe 30. In its optimum form, the flexible strand means 43 comprises a bridle section 44, one end region 45 of which terminally carries hook means 46 engageable, at times, in one open end region 47 of the cross bar 33, flexible sheath means 48 being slidably carried on said region 45 and passing around and beneath the distal end of the member 35 of the boom 31, as is most clearly shown in FIGS. 1 and 3. The other end region 49 of the bridle section 44 similarly carries terminal hook means 50 for engagement in the opposite open end of the cross bar 33, and sheath means 51 which passes around and beneath the distal end of the member 35 of the boom 32.

The bight region 52 of the bridle section 44 securely carries a saddle 53. A separate section 54 of the flexible strand means has one end wrapped about the drum 42 and extends thence about a block 55 secured to the saddle 53, then about a block 56 secured to the mast 16 and thence to clamp means 76 whereby it is secured to the bight region 52 of the bridle section 44. It will be seen that, thus, the flexible strand means 43 as a whole provides an operative connection between the winch 41 and the subframe 30 whereby force may be applied, with great mechanical advantage, to the subframe 30 to lift the same from its horizontal position of FIG. 2 to its upright position.

Near one end of the cross bar 33 there is mounted a bracket 57, said bracket being formed, at its proximal end, to provide a sleeve 58 telescopically receiving the cross bar end. The cross bar is provided with suitable longitudinally-extending guide means 59 which, in the illustrated embodiment of the invention, may be a length of metal rod welded to the cross bar, and a radial notch 60, opening into the interior of the sleeve 58, may be formed in said sleeve to receive and mate with said guide element 59. Thus, the bracket 57 is mounted on the cross bar for longitudinal movement relative thereto, but is held against turning movement about the axis of the cross bar.

At its distal end, the bracket 57 is formed to provide a head 61 presenting a substantially cylindrical surface for a purpose which will become apparent.

Said head 61 is formed with an axial bore 62 in which is oscillably received the shank 63 of a hasp 64 formed with a head 65 and bent to define a base 66 and an arm 67 which is substantially parallel with the shank 63 and suitably spaced from the cylindrical surface of head 61. As is most clearly to be seen in FIGS. 3 and 4, the arm 67 of the hasp 64 cooperates with the cylindrical surface of the head 61 to provide means for embracing an element, such as, for instance, a leaf spring suggested at 68 in FIG. 3, of a vehicle to be towed.

Another bracket 76 is similarly mounted near the other end of the cross bar 33. Since the two brackets and their mountings are alike, except that they are of opposite hand, bracket 76 will not be described in detail.

It will be apparent that, when not in use, the dolly may stand in the condition illustrated in FIG. 1, but preferably with the pins 40 engaged in the perforations 38 and 39 so that there is no strain on the flexible strand means 43. When it is to be transported to a point of use, it will be coupled to a towing vehicle, by means of the coupling element 15, whereby the wheel 17 will ordinarily be lifted off the ground. Upon arrival at the point of use, the pins 40 will be withdrawn and the winch 41 will be operated to lower the subframe 30 to the position of FIG. 2. Now, the dolly will be moved rearwardly, either by movement of the towing vehicle or, after disconnection of the coupler 15, by manual manipulation, to locate the cross bar 33 at a suitable point beneath one end of the vehicle to be towed — for instance, near to, and parallel with, an axle supported by leaf springs. At this time, the brackets 57 and 76 will be positioned near the extremities of the cross bar 33. Now, the hasps 64 are turned so that their bases 66 are substantially upright, the winch 41 is operated to lift the bracket heads 61 substantially into the plane of the lower surfaces of the vehicle springs and the brackets 57 and 76 are individually moved toward the center of the vehicle so that the springs will be separately embraced between the heads 61 and the hasp arms 67 of the respective brackets.

Now, the winch 41 can be operated to swing the subframe 30 about the pivots 28 and 29, thus lifting the engaged end of the vehicle to be towed. As is suggested in FIG. 2, the booms 31 and 32 may be extended to any desired degree before the dolly is backed under the vehicle to be towed, in order to facilitate engagement of the brackets 57 and 76 with the desired portion of the vehicle to be towed. Depending upon the elevation to which it is desired to lift the engaged end of the vehicle to be towed, the pins 36 may be inserted in selected perforations in the members 35 of the booms; and, as the subframe is lifted, the members 35 will slip inwardly into the members 34 during the lifting operation. As the subframe 30 swings, the points of engagement of the springs, or other portions, of the vehicle to be towed will, of course, rock about the cylindrical surfaces of the heads 61, and the hasps 64 will correspondingly turn about their axes. When the lifting operation has been completed, the pins 40 will be inserted through the registering perforations 38 and 39 to retain the subframe in its elevated position.

Either before or after the lifting operation, the hooks 46 and 50 may be disengaged from the cross bar 33 and engaged with suitable elements on the vehicle to be towed so that, during the towing operation, towing force will be applied to that vehicle not only through the subframe 30 but also directly through the flexible strand means 43.

In FIG. 5, I have shown a further means associated with the bracket 57 for embracing a part of the vehicle to be towed. The body of each bracket is formed with inclined slots 69 and 70, said slots being formed, respectively, in planes perpendicular to each other. A length of link chain, indicated generally by the reference numeral 71, carries a hook 72 at one end adapted to be hooked into an opening 74 in an element 73 of the vehicle to be towed. The chain 71 is then wrapped about the body of the bracket 57, as shown in FIG. 5, and one link 75 of the chain is seated in one of the slots 69 or 70, or separate links of the chain may be individually seated in both of said slots, whereby the vehicle part is affirmatively tethered to the bracket.

What is claimed is:

1. A vehicle towing dolly comprising a wheeled chassis, a subframe supported from said chassis to swing, about a transverse axis, between a substantially horizontal position and a substantially upright position, means at the distal region of said subframe for engagement with an element of a vehicle to be towed, and means carried by said chassis for applying force to said subframe to swing the same between said positions, in which said chassis comprises a pair of transversely-spaced hangers dependent below the rear region of said chassis, and said subframe comprises a pair of booms respectively pivotally supported at their proximal ends upon a substantially common transverse axis near the bottoms of said respective hangers and thus below said chassis, and a cross bar spanning and joining the distal regions of said booms.

2. The dolly of claim 1 in which said force-applying means comprises winch means carried by said chassis and flexible strand means providing an operative connection between said winch means and transversely-spaced points on said cross bar.

3. The dolly of claim 1 in which each of said booms comprises a plurality of telescopically-associated members.

4. The dolly of claim 3 including means associated with each boom for selectively limiting the degree of penetration of one of said members into another at any one of a plurality of values.

5. A vehicle towing dolly comprising a wheeled chassis, a subframe supported from said chassis to swing, about a transverse axis, between a substantially horizontal position and a substantially upright position, means at the distal region of said subframe for engagement with an element of a vehicle to be towed, means carried by said chassis for applying force to said subframe to swing the same between said positions, said last-named means comprising winch means on said chassis and flexible strand means providing an operative connection between said winch means and the distal region of said subframe, said flexible strand means comprising a bridle section having its opposite end regions respectively connected at laterally-spaced points to the distal region of said subframe, and a separate section wound on said winch means and operatively connected to the bight region of said bridle section, a saddle at the bight region of said bridle section, a first block secured to said saddle, and a second block carried by said chassis, said separate section of said flexible strand means extending from said winch means through said first block, thence through said second block and thence to an anchorage fixed with respect to said saddle.

6. A vehicle towing dolly comprising a wheeled chassis, a subframe supported from said chassis to swing, about a transverse axis, between a substantially horizontal position and a substantially upright position, means at the distal region of said subframe for engagement with an element of a vehicle to be towed, and means carried by said chassis for applying force to said subframe to swing the same between said positions, in which said subframe comprises a pair of booms pivotally mounted to swing about a common fixed axis extending transversely of said chassis, and a cross bar joining the distal regions of said booms, the opposite end regions of said cross bar being open, said force-applying means comprising winch means on said chassis and flexible strand means having a bridle section and having a second section wound on said winch means and operatively connected to the bight region of said bridle section, one end region of said bridle section being passed around one of said booms and bearing a hook engageable in the adjacent open end of said cross bar, and the other end region of said bridle section being passed around the other of said booms and bearing a hook engageable in the adjacent open end of said cross bar.

7. A vehicle towing dolly comprising a wheeled chassis, a subframe supported from said chassis to swing, about a transverse axis, between a substantially horizontal position and a substantially upright position, means at the distal region of said subframe for engagement with an element of a vehicle to be towed, and means carried by said chassis for applying force to said subframe to swing the same between said positions, in which said subframe comprises a pair of booms pivotally mounted to swing about a common fixed axis extending transversely of said chassis, and a cross bar joining the distal regions of said booms, bracket means carried by said cross bar at laterally spaced positions, each bracket means being rotationally fixed but longitudinally movable relative to said cross bar and means associated with each bracket means for embracing an element of a vehicle to be towed.

8. The dolly of claim 7 in which each bracket means is formed to provide a distally-presented, substantially cylindrical surface and said embracing means comprises a hasp mounted for oscillation about the axis of said surface and having an arm spaced from, and axially parallel to, said surface to define, with said surface, a space opening toward the transverse center of said subframe.

9. The dolly of claim 7 in which each bracket means has a body extending rearwardly away from said cross bar and formed with an open-mouthed slot, and said embracing means comprises a length of chain having hook means at one end for engagement with such a vehicle element with said chain wrapped about at least a part of such vehicle element and at least part of said bracket means and with a link of said chain anchored to said bracket means by seating in said slot.

* * * * *

PO-1050
(5/69)

UNITED STATES PATENT OFFICE
CERTIFICATE OF CORRECTION

Patent No. 3,703,240                    Dated November 21, 1972

Inventor(s) Arvin E. Russell

It is certified that error appears in the above-identified patent and that said Letters Patent are hereby corrected as shown below:

In the caption, the address of the inventor should read
-- 115 D. Antoinette Place, Indianapolis, Indiana 46227 --.
Column 2, line 60, "76" should be -- 78 --.
Column 3, line 22, after "of" insert -- the --.

Signed and sealed this 1st day of May 1973.

(SEAL)
Attest:

EDWARD M. FLETCHER, JR.                ROBERT GOTTSCHALK
Attesting Officer                       Commissioner of Patents